(12) United States Patent
O'Brien et al.

(10) Patent No.: US 11,919,993 B2
(45) Date of Patent: Mar. 5, 2024

(54) POLYOLS FOR LOW-VOC POLYURETHANE APPLICATIONS

(71) Applicant: Stepan Company, Northfield, IL (US)

(72) Inventors: Michael E. O'Brien, Hainesville, IL (US); Jeffrey R. Janos, Antioch, IL (US)

(73) Assignee: Stepan Company, Northbrook, IL (US)

( * ) Notice: Subject to any disclaimer, the term of this patent is extended or adjusted under 35 U.S.C. 154(b) by 311 days.

(21) Appl. No.: 16/936,006

(22) Filed: Jul. 22, 2020

(65) Prior Publication Data

US 2020/0347176 A1 Nov. 5, 2020

Related U.S. Application Data

(63) Continuation of application No. PCT/US2019/014563, filed on Jan. 22, 2019.

(60) Provisional application No. 62/688,507, filed on Jun. 22, 2018, provisional application No. 62/620,672, filed on Jan. 23, 2018.

(51) Int. Cl.
*C08G 18/42* (2006.01)
*C08G 18/76* (2006.01)
*C08G 18/78* (2006.01)
*C09D 175/06* (2006.01)

(52) U.S. Cl.
CPC ..... *C08G 18/4219* (2013.01); *C08G 18/4241* (2013.01); *C08G 18/7664* (2013.01); *C08G 18/7831* (2013.01); *C09D 175/06* (2013.01); *C08G 2150/00* (2013.01)

(58) Field of Classification Search
CPC ............ C08G 18/4219; C08G 18/4241; C08G 18/7664; C08G 18/7831; C08G 2150/00; C09D 175/06; C08L 75/06
See application file for complete search history.

(56) References Cited

U.S. PATENT DOCUMENTS

| 3,201,372 | A | 8/1965 | Wagner |
| 5,670,599 | A | 9/1997 | Bassner |
| 6,664,363 | B1 | 12/2003 | Faunce |

(Continued)

FOREIGN PATENT DOCUMENTS

| EP | 0731119 A2 | 9/1996 |
| JP | H04328123 | 11/1992 |
| WO | 2012072540 | 6/2012 |

OTHER PUBLICATIONS

European Patent Office, Extended European Search Report, issued in connection with Patent Application No. 19743617.3, dated Sep. 15, 2021, 8 pages.

(Continued)

*Primary Examiner* — Satya B Sastri
(74) *Attorney, Agent, or Firm* — McAndrews, Held & Malloy, Ltd.

(57) ABSTRACT

Polyester polyols for use in low-VOC polyurethane compositions are disclosed. The polyester polyols are the reaction product of at least one aliphatic polycarboxylic acid, at least one alkoxylated polyalcohol having a functionality of 2.0 or greater, and one or more polyalcohols other than an alkoxylated polyalcohol. The polyester polyols can be formulated into polyurethane compositions to obtain a polyurethane having a low VOC content. The polyurethane composition is particularly suitable for polyurethane coating applications.

16 Claims, 3 Drawing Sheets

(56) References Cited

U.S. PATENT DOCUMENTS

| | | |
|---|---|---|
| 6,740,686 B1 | 5/2004 | Ghesquiere et al. |
| 8,912,245 B2 | 12/2014 | Lista |
| 2004/0186247 A1 | 9/2004 | Vandevoorde |
| 2004/0242765 A1 | 12/2004 | Munzmay et al. |
| 2006/0057393 A1 | 3/2006 | Reisch et al. |
| 2007/0049684 A1* | 3/2007 | Rische ............... C08G 18/4252 428/423.1 |
| 2009/0062482 A1* | 3/2009 | Blum .................. C09D 175/06 525/450 |
| 2009/0281271 A1 | 11/2009 | Bruchmann et al. |
| 2012/0245246 A1 | 9/2012 | Yin et al. |

OTHER PUBLICATIONS

International Search Report and Written Opinion, International Patent Application No. PCT/US2019/14563, dated Apr. 10, 2019, 17 pages.
Japan Patent Office, Office Action, Application No. 2020-561575, dated Nov. 24, 2022, 3 pages.
Europe Patent Office, Office Action, Application No. 19743617.3, dated Jul. 20, 2023, 9 pages.

* cited by examiner

POLYOLS FOR LOW-VOC POLYURETHANE APPLICATIONS

CROSS-REFERENCE TO RELATED APPLICATIONS

This application is a continuation of and claims priority to PCT Application No. US19/14563, filed Jan. 22, 2019, which claims priority to U.S. Provisional Application No. 62/688,507, filed Jun. 22, 2018 and U.S. Provisional Application No. 62/620,672, filed on Jan. 23, 2018. The entire specifications of the PCT and provisional applications referred to above are hereby incorporated by reference.

BACKGROUND OF THE INVENTION

The present technology relates to polyester polyols for use in low-VOC polyurethane compositions, and to polyurethane compositions comprising such polyester polyols.

Polyurethanes have been used in a wide variety of applications, including coatings for various substrates, such as plastics, wood, glass, metal, and concrete. Important properties for such polyurethane coatings include abrasion and chemical resistance, and hardness. Polyester polyol resins used in preparing polyurethane coatings often have viscosities of greater than 15,000 cps at 25° C., and therefore require solvents to reduce the viscosity of the resins for easier handling and formulation into polyurethane coating compositions.

Polyurethanes have also been used in a variety of adhesive compositions for different substrates. Many of these adhesive compositions contain a large amount of solvents, which are undesirable from an environmental standpoint.

Recently, there has been a greater emphasis on reducing the amount of volatile organic compounds (VOCs) being released into the environment. Stricter regulations limiting VOCs have been proposed, and are being adopted in certain regions or for certain applications. For example, the most recent standard for architectural and industrial maintenance coatings SCAQMD lowered the allowable VOC limit to less than or equal to 150 g/L. It is therefore becoming more important to limit or eliminate solvents from polyester resins, and polyurethane compositions employing such resins.

Traditionally, there have been two ways to reduce formulation VOCs: move to water-borne formulations, or increase the amount of solids in a solvent-borne formulation. Water-borne formulations have the best potential to reduce VOCs to zero, but typically suffer from inferior performance compared to solvent-borne formulations. In addition, water-borne formulations can require significant adjustments in processing, products, and application. High solids solvent-borne formulations are similar to traditional solvent-borne formulations in terms of processing and production, but in some applications, it can be more difficult to sell the value of applied cost for a formulation that is more expensive due to the higher solids content.

There remains a need in the art to provide polyester polyols that can reduce or eliminate the need to include solvents to facilitate use of the polyester polyols in polyurethane formulations and applications.

There is also a need for low or no VOC polyester polyols that can provide equivalent or improved physical properties compared to solvent-borne polyester polyols, when used in polyurethane compositions.

SUMMARY OF THE INVENTION

In one aspect, the present technology relates to polyester polyols that comprise the reaction product of (a) a polycarboxylic acid component comprising from 55 mol % to 100 mol %, based on the polycarboxylic acid component, of an aliphatic polycarboxylic acid, or an anhydride, halide, alkyl ester or lactone derivative thereof; and from 0% to 45 mol %, based on the polycarboxylic acid component, of an aromatic polycarboxylic acid, or an anhydride, halide, alkyl ester or lactone derivative thereof; (b) at least one alkoxylated polyalcohol; and (c) at least one polyalcohol other than an alkoxylated polyalcohol, wherein the polyester polyol has an OH value of 30 to 800 mg KOH/g.

In a further aspect, the present technology relates to a polyester polyol blend for preparing a polyurethane composition, wherein the polyester polyol blend comprises a polyester polyol comprising the reaction product of: (a) a polycarboxylic acid component, or an anhydride, halide, alkyl ester or lactone derivative thereof, or a combination thereof, comprising: (i) from 55 mol % to 100 mol %, based on the polycarboxylic acid component, of at least one aliphatic polycarboxylic acid; and (ii) from 0% to 45 mol %, based on the polycarboxylic acid component, of at least one aromatic polycarboxylic acid; (b) at least one alkoxylated polyalcohol having an average functionality of 2.0 or greater; and (c) at least one polyalcohol other than an alkoxylated polyalcohol, wherein the polyester polyol has a functionality of 2.0 or greater, and an OH value of 30 to 800 mg KOH/g; and optionally, one or more additional components having two or more active hydrogen groups; wherein the polyurethane composition is a coating, adhesive, sealant, elastomer, or foam.

In another aspect, the present technology relates to a polyurethane composition comprising (1) a polyester polyol comprising the reaction product of: (a) a polycarboxylic acid component, or an anhydride, halide, alkyl ester or lactone derivative thereof, or a combination thereof, comprising (i) from 55 mol % to 100 mol %, based on the polycarboxylic acid component, of at least one aliphatic polycarboxylic acid; and (ii) from 0% to 45 mol %, based on the polycarboxylic acid component, of at least one aromatic polycarboxylic acid; (b) at least one alkoxylated polyalcohol having an average functionality of 2.0 or greater; and (c) at least one polyalcohol other than an alkoxylated polyalcohol, wherein the polyester polyol has a functionality of 2.0 or greater, and an OH value of 30 to 800 mg KOH/g; and (2) at least one isocyanate, polyisocyanate, or a combination thereof.

DETAILED DESCRIPTION OF THE PREFERRED EMBODIMENTS

Figure 1:
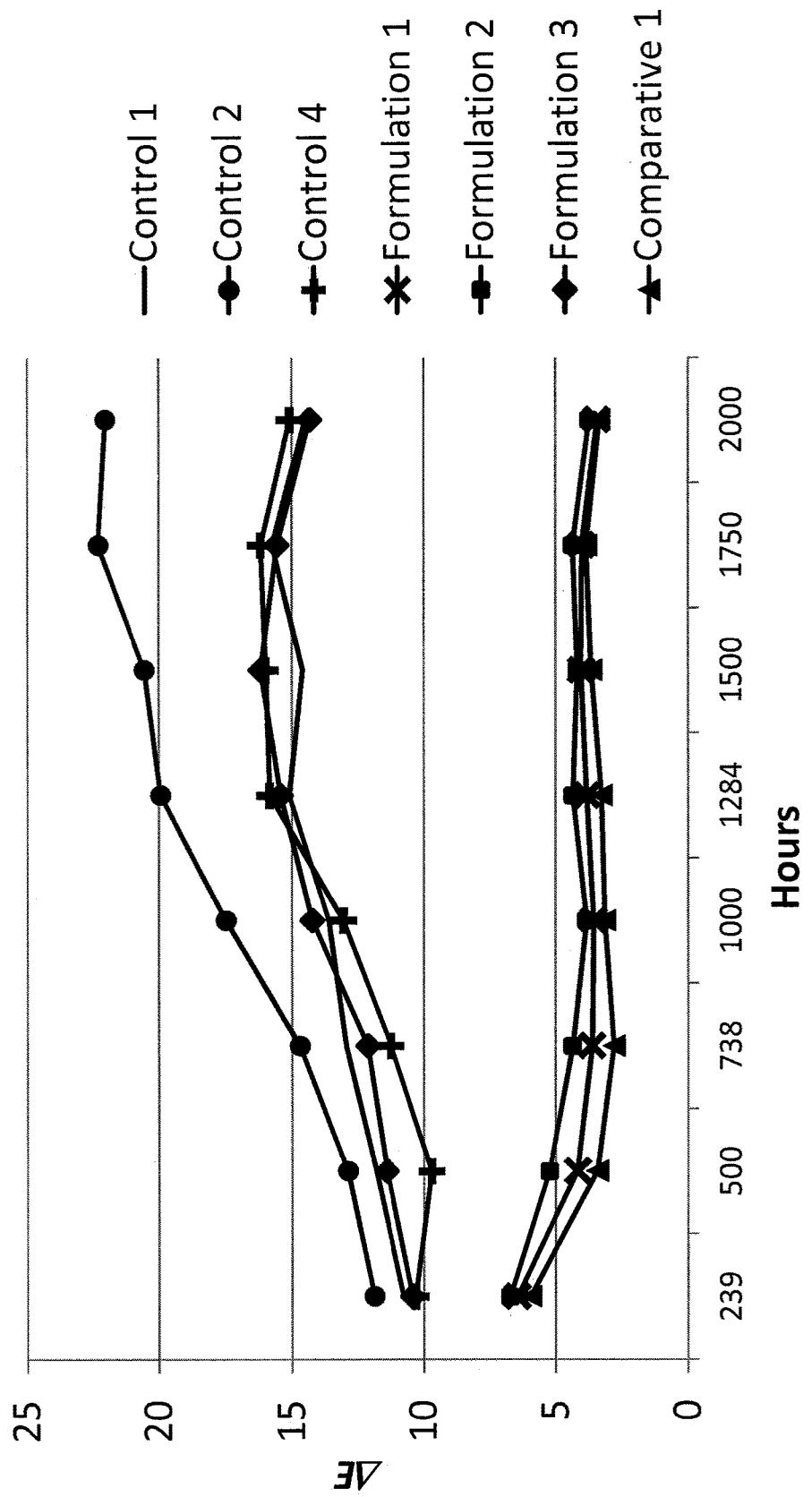
FIG. 1 is a graph comparing the color stability of polyurethane coating formulations of the present technology against commercial coating formulations after UV exposure over a period of 2000 hours.

The term "functionality" as used herein means the number of reactive groups, e.g., hydroxyl groups, in a molecule.

The terms "high functional" or "high functionality" as used herein refer to a functionality greater than 2.

The term "hydroxyl value" or "OH value" or "OHV" as used herein refers to a quantitative measure of the concentration of hydroxyl groups, usually stated as mg KOH/g, i.e., the number of milligrams of potassium hydroxide equivalent to the hydroxyl groups in 1 g of substance.

The term "polyhydric alcohol" or "polyalcohol" as used herein includes diols, triols, and higher functionality hydroxyl-containing compounds having an average functionality of greater than three.

The term "polycarboxylic acid" as used herein includes dicarboxylic acids, tricarboxylic acids, and higher functionality carboxylic acids having more than three carboxylic acid groups. "Polycarboxylic acid derivatives" include anhydrides, halides, lactones, and alkyl esters.

The term "polyester polyol" as used herein means a polyol having ester linkages.

The term "low amount" or "low VOC" as used herein refers to an amount of volatile organic compounds in the polyurethane composition that is less than 200 g/liter, or less than 150 g/liter, or less than 125 g/liter, measured in accordance with EPA Method 24 for Analysis of Total Volatiles.

While the present technology will be described in connection with one or more preferred embodiments, it will be understood by those skilled in the art that the technology is not limited to only those particular embodiments. To the contrary, the present technology includes all alternatives, modifications, and equivalents as may be included within the spirit and scope of the appended claims.

The present technology encompasses a polyester polyol that is the reaction product of a polycarboxylic acid component that comprises at least 55% by weight of an aliphatic polycarboxylic acid, or an anhydride, halide, alkyl ester, or lactone derivative thereof, at least one alkoxylated polyalcohol, and at least one polyhydric alcohol (polyalcohol) other than an alkoxylated polyalcohol. In some embodiments, the polyester polyols have a low viscosity, which enables them to be used in low VOC polyurethane compositions, such as polyurethane compositions for polyurethane coating, adhesive, sealant, elastomer, or foam applications. The present technology also encompasses low VOC polyurethane compositions comprising the polyester polyol, and polyurethane coatings made from the polyurethane compositions.

Polyester Polyol

The polyester polyol of the present technology is the esterification reaction product resulting from reacting a polycarboxylic acid component, or an anhydride, halide, alkyl ester, or lactone derivative thereof, with at least one alkoxylated polyalcohol, and at least one polyalcohol other than an alkoxylated polyalcohol.

Polycarboxylic Acid Component

The polycarboxylic acid component comprises from 55 mol % to 100 mol % of one or more of aliphatic carboxylic acids, cycloaliphatic carboxylic acids, or combinations thereof, and from 0% to 45 mol % of one or more aromatic carboxylic acids. The polycarboxylic acid component can be one or more dicarboxylic acids, tricarboxylic acids, higher functionality carboxylic acids, or mixtures of such acids. Suitable dicarboxylic acids include straight or branched aliphatic diacids, cycloaliphatic diacids, or mixtures thereof, having from 4 to 22 carbon atoms, including the carbon atoms contained in the carboxy group, and aromatic dicarboxylic acids having a total of 8 to 16 carbon atoms. Derivatives of these dicarboxylic acids, such as anhydrides, halides, lactones, or alkyl esters of diacids, can also be used in the present technology. Preferred aliphatic dicarboxylic acids are diacids having from 4 to 16 carbon atoms, alternatively from 6 to 12 carbon atoms. Representative examples of dicarboxylic acids include glutaric acid, adipic acid, succinic acid, maleic acid, fumaric acid, sebacic acid, pimelic acid, octanedioic acid, dodecanedioic acid, azelaic acid, 1,4-cyclohexanedi-carboxylic acid, phthalic acid, terephthalic acid, and isophthalic acid. Representative examples of triacids or higher functional polyacids include citric acid, isocitric acid, trimellitic acid, pyromellitic acid, trimellitic anhydride, and pyromellitic anhydride.

When the polycarboxylic acid component comprises one or more aromatic carboxylic acids, the resulting polyester polyol may have an increased viscosity, necessitating the use of a solvent with the polyester polyol, and increasing the VOCs of the polyester polyol. Aromatic carboxylic acids, if present, are therefore used in amounts of 45 mol % or less, alternatively 40 mol % or less. The amount of polycarboxylic acid used in preparing the polyester polyol can be from about 10 mol % to about 70 mol %, alternatively about 10 mol % to about 60 mol %, alternatively about 10 mol % to about 55 mol %, based on the total moles of the components forming the polyester polyol.

Alkoxylated Polyalcohol Component

The alkoxylated polyalcohol component is prepared by alkoxylation of a polyalcohol having an average functionality of greater than or equal to 2.0. In some embodiments, the alkoxylated polyalcohol has an average functionality of greater than or equal to 3.0. The alkylene oxide for alkoxylation of the polyalcohol is selected from ethylene oxide, propylene oxide, butylene oxide, or a combination thereof. In some embodiments, the alkylene oxide is ethylene oxide. Amounts of alkoxylation in the alkoxylated polyalcohol can range from two to about fifteen units of ethylene oxide, propylene oxide, butylene oxide, or a combination thereof, depending on the desired properties and end use of the polyester polyol. In general, higher amounts of alkoxylation in the alkoxylated polyalcohol will result in polyester polyols that provide softer polyurethane coatings.

The polyalcohol for forming the alkoxylated polyalcohol can be selected from diols, triols, polyalcohols that have an average functionality of greater than three, and combinations thereof. Examples of such polyalcohols include glycerol, diglycerol, trimethylolpropane, pentaerythritol, dipentaerythritol, sucrose, glucose, fructose, lactose, sorbitol, mannitol, methyl glucoside, and combinations thereof. Suitable alkoxylated polyalcohols are also commercially available under the tradename Perstorp. In one embodiment, the alkoxylated polyalcohol is ethoxylated trimethylolpropane. In another embodiment, the alkoxylated polyalcohol is ethoxylated trimethylolpropane with 3 units of ethylene oxide. The amount of the alkoxylated polyalcohol component used in preparing the polyester polyol can be about 10 mol % to about 70 mol %, alternatively about 10 mol % to about 60 mol %, alternatively about 15 mol % to about 55 mol %, alternatively about 25 mol % to about 50 mol %, based on the total moles of the components forming the polyester polyol reaction mixture. It should be understood that the total moles of the components forming the polyester polyol reaction mixture add up to 100%.

Polyalcohol Component

The polyalcohol component other than the alkoxylated polyalcohol can be a straight or branched, aliphatic or aromatic diol. Examples of diols include ethylene glycol, diethylene glycol, triethylene glycol, propylene glycol, dipropylene glycol, trimethylene glycol, butylene glycols, neopentyl glycol, 2,2-dimethyl-1,3 propane diol, 1,6-hexanediol, 2-methyl-1,3-propanediol, 1,3-propane glycol, 1,3-butanediol, 1,4-butanediol, 1,5-pentanediol, 3-hydroxy-2,2-dimethylpropyl-3-hydroxy-2,2-dimethyl propanoate (HPHP), 1,2-cyclohexanediol, 1,3-cyclohexanediol, 1,3-cyclohexanedimethanol, 1,4-cyclohexanedimethanol, resorcinol, hydroquinone, and poly(oxyalkylene) polyols derived by the condensation of ethylene oxide, propylene oxide, or a combination thereof. Mixtures of any of the diols are also contemplated. The polyalcohol component can also include triols, higher functional polyols that have an average functionality of greater than three, or mixtures thereof. Examples of triols and higher functional polyalcohols include glycerol, diglycerol, trimethylolpropane, pentaerythritol, dipentaerythritol, sugars, such as sucrose, glucose, and fructose; sugar alcohols, such as sorbitol and mannitol, and combinations of any of the foregoing. A mixture of diols, triols, and/or higher functional polyalcohols is also contemplated for some embodiments. The amount of the polyalcohol component used in preparing the polyester polyol can be from about 10 mol % to about 70 mol %, alternatively about 10 mol % to about 60 mol %, alternatively about 10 mol % to about 55 mol %, alternatively about 12 mol % to about 50 mol %, based on the total moles of the components forming the polyester polyol.

Optional Components

The polyester polyol of the present technology may also comprise additional optional components. For example, natural oils, such as soybean oil, castor oil, or a mixture thereof, can be incorporated into the backbone of the polyester polyol to modify or enhance desired properties of the polyester polyol and the polyurethane compositions formed therefrom. Amounts of natural oil can range from 0% up to about 40 mol %, depending on the end use formulation and application.

The polyester polyols of the present technology are prepared by adding all of the components into a suitable vessel, and subjecting the component mixture to heating, or heating under reduced pressure, in the presence of a catalyst, if necessary, until the reaction product has an Acid Value of less than 10.0, alternatively 5.0 or less, alternatively 2.5 or less, alternatively 2.0 or less, alternatively 1.5 or less, alternatively 1.0 or less, preferably 0.8 or less. Catalysts for the reaction can be a transition metal catalyst selected from the group consisting of titanates, zirconates, tin-based catalysts, tetraisopropyl titanate, tetrabutyltitanate, dibutyl tin oxide, oxides of zinc, oxides of lead, oxides of antimony, and combinations thereof. Other catalysts, such as alkali metal catalysts or Lewis or Bronsted acids can also be used. The resulting polyester polyol has an OH value of about 30 mg KOH/g to about 800 mg KOH/g, alternatively about 100 to about 800 mg KOH/g, alternatively about 150 to about 600 mg KOH/g, alternatively about 200 to about 600 mg KOH/g, alternatively 250 to about 500 mg KOH/g. The resulting polyester polyol also has an average molecular weight of about 140 to about 11,000, depending on functionality. For example, a polyester polyol having an OH value of about 30 mg KOH/g and an average functionality in the range of 2.0 to 6.0 has an average molecular weight of about 3,700 to about 11,220. A polyester polyol having an OH value of about 800 mg KOH/g and an average functionality in the range of 2.0 to 6.0 has an average molecular weight of about 140 to about 420.

In some embodiments, the polyester polyol has a viscosity of about 25,000 cps or less at 25° C. In alternative embodiments, the polyester polyol has a viscosity of about 15,000 cps or less at 25° C., alternatively about 10,000 cps or less at 25° C., alternatively about 500 cps to 10,000 cps, alternatively about 500 cps to less than about 10,000 cps, alternatively about 700 cps to less than about 10,000 cps, alternatively about 800 cps to less than about 10,000 cps, alternatively about 1,000 cps to less than about 10,000 cps at 25° C. The polyester polyol also has an average functionality of greater than or equal to about 2.0, preferably greater than 2.0. Suitable functionalities can range from greater than 2 to about 6, although higher functionalities are also contemplated.

Polyurethane Compositions

The polyurethane compositions of the present technology are prepared by reacting at least one isocyanate with the polyester polyol of the present technology, and optionally one or more additional components to form a polyurethane reaction product. In some embodiments, the polyurethane composition is a one part moisture-cured polyurethane composition. Such compositions can be prepared by reacting the polyester polyol of the present technology with an excess of isocyanate to form an isocyanate-terminated polyurethane prepolymer. In these one-part polyurethane compositions, the measured amount of NCO content in the prepolymer can be between about 1% up to about 48% NCO. In other embodiments, the polyurethane composition is a two-part polyurethane composition that combines a "B-side" that comprises the polyester polyol of the present technology, with an "A-side" that comprises at least one isocyanate, polyisocyanate, or a combination thereof.

The B-side comprises the polyester polyol of the present technology in an amount of about 5% to about 95% by weight, based on the weight of the B-side components. In some embodiments, the polyester polyol comprises about 30% to about 95%, alternatively about 40% to about 90% by weight of the B-side components. The B-side also typically contains a suitable urethane catalyst. Such catalysts are known in the art and include tertiary amine compounds, amines with isocyanate reactive groups, and organometallic compounds. Exemplary organometallic catalysts include organomercury, organolead, organoferric and organotin catalysts. Other suitable catalysts include one or more members selected from the group consisting of metal catalysts, such as an alkali metal alkoxide such as potassium octoate, stannous octoate, stannous chloride, tin salts of carboxylic acids such as dibutyltin dilaurate, bismuth neodecanoate, and amine compounds, such as triethylenediamine (TEDA), N-methylimidazole, 1,2-dimethylimidazole, N-methylmorpholine, N-ethylmorpholine, trimethylamine, triethylamine, N,N'-dimethylpiperazine, 1,3,5-tris(dimethylaminopropyl) hexahydrotriazine, 2,4,6-tris(dimethylaminomethyl)phenol, N-methyldicyclohexylamine, N,N-dimethylcyclohexylamine, tetramethylethylenediamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis (N,N-dimethylaminopropyl)-N'-methyl amine, 1-methyl-4-dimethylaminoethylpiperazine, 3-methoxy-N-dimethylpropylamine, N-ethylmorpholine, N-cocomorpholine (CAS No. 72906-09-3, a product of BASF SE, Ludwigshafen, Germany), N,N-dimethyl-N',N'-dimethyl isopropylpropylenediamine, N,N-diethyl-3-diethylamino-propylamine, diethylethanolamine, 3-methoxypropyldimethylamine, N,N,N'-trimethylisopropylpropylenediamine, 3-diethylaminopropyl-diethylamine, and dimethylbenzylamine, as well as any mixture thereof. The amount of catalysts can vary from greater than 0 to about 5% by weight of the total B-side components, such as about 0.05 to about 5% by weight, or about 0.1 to about 5% by weight of the total B-side components.

Depending on the desired properties, the B-side may optionally contain additional polyols, or other compounds or resins having groups that are reactive with the isocyanate groups. Such additional components include, but are not limited to, aliphatic and/or aromatic polyester polyols, polyether polyols, polyester polyether polyols, polycarbonate polyols, acrylic polyols, amine polyols, polycaprolactones, silicones, hydroxyl-containing thioethers, aspartic resins, oxazolidine, and ketimine resins. Additional aliphatic polyols can be glycol derivatives, such as polyethylene glycol, polypropylene glycol, or a mixture thereof. Desirable glycols have an average molecular weight of about 400 or less. Optional aromatic polyester polyols can be, for example, aromatic polyester polyols that are the reaction product of phthalic acid, isophthalic acid, terephthalic acid or phthalic anhydride reacted with an excess of diol or higher functional polyalcohol (for example, any of the diols or polyalcohols noted above). The B-side may also comprise polyether polyols having a molecular weight of 250 or higher, such as polyoxyethylene glycols, polyoxypropylene glycols, or combinations thereof. Suitable amounts of additional compounds or resins will depend upon the desired properties and end use for the polyurethane compositions, and the overall compatibility of the components in the polyurethane compositions.

The B-side can also contain optional additives. For example, the additives can include one or more of defoaming agents, pigments, UV stabilizers, wetting agents, leveling agents, corrosion inhibitors, reactive diluents, or any combination thereof. Although additives are typically incorporated into the B-side, it is understood that they could also be incorporated into the A-side portion when the additive is compatible with the isocyanate compound. In general, pigments can comprise from 0% to about 60% by weight based on the total weight of the B-side components. Suitable amounts of other additives will depend on the end use of the polyurethane composition, and one skilled in the art can determine appropriate amounts.

The isocyanate-containing "A-side" comprises an isocyanate component, preferably a polyisocyanate component. A polyisocyanate is herein defined as having two or more isocyanate functionalities. Examples of suitable polyisocyanates include conventional aliphatic, cycloaliphatic, and aromatic isocyanates or mixtures thereof, having a nominal functionality in the range of about 2.25 to about 4. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate (HDI), and biuret or trimers of HDI; cycloaliphatic diisocyanates such as 1,3- and 1,4-cyclohexane diisocyanate, as well as any mixtures of these isomers, 1-isocyanato-3,3,5-trimethyl-5-isocyanatomethylcyclohexane (isophorone diisocyanate), 2,4- and 2,6-hexahydrotoluene diisocyanate and the corresponding isomeric mixtures, 4,4'-2,2'- and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates, naphthylene-1,5-diisocyanate, polyphenylene polymethylene polyisocyanates (crude MDI); naphthalene-1,5-diisocyanate, and triphenylmethane-4,4'4'-triisocyanate.

In one embodiment, the polyisocyanate component used in the A-side portion is a biuret or isocyanurate of hexamethylene diisocyanate (HDI) having a nominal functionality of approximately 3, and an NCO content of approximately 23 weight percent. In an alternative embodiment, the polyisocyanate component is a polymeric diphenylmethane diisocyanate (polymeric MDI) having a nominal functionality of approximately 2.8 and an NCO content of approximately 31.5 weight percent.

The 2-part polyurethane composition of the present technology is prepared by reacting the A-side and B-side in a proportion of NCO to OH groups of about 0.9:1 to about 1.3:1, preferably about 1.05:1 (excess isocyanate). The A-side and B-side can be mixed and applied to a substrate by any standard means known in the art, such as rolling, brushing, spraying, electrostatic spraying, or dipping. Numerous suitable substrates include metal, wood, glass, plastics, and cements. The polyurethane composition can be a coating composition that can be used alone or in combination with one or more additional coatings. For example, the polyurethane composition comprising the A-side and the B-side can be applied as a primer or base coating, or alternatively as a top coating. After applying the polyurethane composition to the substrate, the polyurethane reaction product is allowed to cure into the final polyurethane coating. Curing temperatures can range from about 0° C. to about 200° C.

The polyurethane composition has several advantageous properties. One advantage is that the polyurethane compositions and coatings of the present technology can have a low amount of volatile organic compounds (VOCs). In some embodiments, the VOC amounts in the polyurethane composition are less than 200 g/liter, alternatively less than 150 g/liter, alternatively less than 125 g/liter, measured according to EPA Method 24 for analysis of Total Volatiles. In some embodiments, the low VOC amounts are due to the use of polyester polyols of the present technology that have a lower viscosity, such as less than 15,000 cps at 25° C. or less than 10,000 cps at 25° C. Such lower viscosity polyester polyols require less solvent for ease of handling which reduces the amount of VOCs in the polyurethane composition. The polyurethane compositions of the present technology provide better abrasion resistance than current industrial standards, when formulated into polyurethane coatings. The polyurethane coatings also have equal or better chemical resistance and comparable gloss levels compared to standard industrial coatings, and substantially equivalent physical properties in comparison to epoxy and acrylic urethane coatings. The polyurethane compositions of the present technology are useful as floor or general purpose maintenance coatings, although other uses are also contemplated.

The presently described technology and its advantages will be better understood by reference to the following examples. These examples are provided to describe specific embodiments of the present technology. By providing these examples, the inventors do not limit the scope and spirit of the present technology.

The following test methods are used to determine properties and performance of the polyurethane composition and coating resulting from the composition.

Tabor abrasion testing is performed in accordance with ASTM D4060-10, using a CS-17 wheel with 1,000 gram load, and 1,000 cycles. Gloss is measured in accordance with ASTM D523-14 at 60° gloss. Shore D hardness is measured in accordance with ASTM D2240-05, and König hardness is measured in accordance with ASTM D4366-14. Pencil hardness is measured in accordance with ASTM D3363-05. Adhesion of the coating to a substrate is measured according to ASTM D 3359-95a. The VOC content is calculated according to EPA Method 24 for Analysis of Total Volatiles.

Chemical resistance testing is performed by preparing a sample of polyurethane reaction product weighing approximately 3.5 g, and immersing the sample into the desired testing solution for 4 weeks. The sample weight is measured periodically, and the change in total weight of the sample after the duration of the test is recorded.

Weathering testing is conducted according to ASTM G154, Cycle 1 in a QUV Accelerated Weather Tester (Q-Panel). The test assesses UV resistance and stability of a coating by measuring color change (ΔE) and gloss. The test conditions are shown in the Table below. Color change is assessed in accordance with ASTM D2244-14. Samples used in this test were aluminum panels. No UV stabilizers were added to any of the comparative or example formulations.

ASTM G154 Cycle 1 Test Conditions

Lamp type: UVA-340

| Step | Function | Irradiance (W/m2) | Temperature (° C.) | Time (hours:minutes) |
|---|---|---|---|---|
| 1 | UV | 0.89 | 60 | 8:00 |
| 2 | Condensation | n/a | 50 | 4:00 |
| 3 | Final step-Go to Step 1 | | | |

The samples were run for 2000 hours and the 60 degree gloss and change in color (ΔE) were monitored throughout the test. Samples were rotated every 250 hours. For gloss, a BYK-Gardner Micro-TRI-gloss meter was used to make the measurements. The gloss measurements were done at different time intervals throughout the test. For color change measurements, (ΔE), an X-Rite spectrophotometer was used. In this test, only the L*, a*, and b* measurements were made at different time intervals to calculate the color change (ΔE). In the L*, a*, b*, color space, component L* refers to the lightness coordinate; component a* refers to the red/green coordinate, with +a indicating red, and −a indicating green; b* component refers to the yellow/blue coordinate, with +b indicating yellow, and −b indicating blue. Delta E represents the overall sample difference in L*, a*, b* coordinates. The lower the ΔE value, the least color change in the sample. Ideally, the ΔE value would be 0, indicating no color change occurred. Delta b* represents the difference in the b* coordinate values of the sample, and is an indication of the amount of yellowing of the sample. The lower the Δb* value, the less yellowing of the sample.

Example 1: Polyester Polyol

Adipic acid (AA) (322 g), neopentyl glycol (NPG) (211 g) and trimethylolpropane ethoxylate (TMP3EO) (547 g) were added to a reaction flask equipped with an overhead stirrer, thermocouple, nitrogen sparge line and distillation head. The contents were heated to 170-220° C. under nitrogen. When the acid value reached 15-20 mg KOH/g, a titanium-based catalyst (0.05 g) was added and the reaction was allowed to continue until the acid value was less than 0.8 mg KOH/g. The final analysis of the polyol was as follows: Acid value: 0.26 mg KOH/g; Hydroxyl value: 306.1 mg KOH/g; % Water: 0.03%; Viscosity at 25° C.: 3709 cP; at 80° C.: 124 cP.

Example 2: Polyester Polyol

A polyester polyol was prepared using the method of Example 1, except that the reactants were adipic acid (AA) (517.5 g), trimethylolpropane ethoxylate (TMP3EO) (1214.5 g), 3-hydroxy-2,2-dimethylpropyl 3-hydroxy-2,2-dimethylpropanoate (HPHP) (586.2 g), and ethylene glycol (EG) (9.4 g), and the catalyst amount was 0.12 g.

Example 3: Polyester Polyol

A polyester polyol was prepared using the method of Example 1, except that the reactants were adipic acid (AA) (566.2 g), isophthalic acid (Iso) (214.8 g), trimethylolpropane ethoxylate (TMP3EO) (1278.6 g), and 2-methyl-1,3-propandiol (MP-Diol) (426.6 g), and the catalyst amount was 0.12 g.

Comparative polyester polyols 1, 2, and 3 were prepared using a method similar to Example 1, and using the same components used to prepare Examples 1, 2, and 3, respectively, except that trimethylolpropane was used instead of trimethylolpropane ethoxylate. The charge amounts for the Comparative polyester polyols were selected to match the theoretical functionality and OH value of the corresponding Example polyester polyols. The composition of Comparative polyester polyols 1, 2, and 3 can be represented as AA/TMP/NPG, AA/HPHP/TMP/EG, and AA/Iso/TMP/MP-Diol, respectively. The physical properties of the Example and Comparative polyester polyols are shown in Table 1.

TABLE 1

Physical Properties

| Polyol | Composition | Hydroxyl Value (mg KOH/g) | Theoretical Functionality | Viscosity @ 25° C. (cP) |
|---|---|---|---|---|
| Example 1 | AA/TMP3EO/NPG | 306 | 3.1 | 3,709 |
| Example 2 | AA/HPHP/TMP3EO/EG | 318 | 3.1 | 3,040 |
| Example 3 | AA/Isophthalic acid/TMP3EO/MP-Diol | 310 | 3.1 | 3,849 |

TABLE 1-continued

Physical Properties

| Polyol | Composition | Hydroxyl Value (mg KOH/g) | Theoretical Functionality | Viscosity @ 25° C. (cP) |
|---|---|---|---|---|
| Comparative 1 | AA/TMP/NPG | 310 | 3 | 13,197 |
| Comparative 2 | AA/HPHP/TMP/EG | 314 | 3.1 | 17,496 |
| Comparative 3 | AAIsophthalic acid/TMP/MP-Diol | 314 | 3.1 | 27,594 |

Table 1 shows that the viscosity of the Example polyester polyols, prepared with alkoxylated polyalcohol, is significantly lower that the viscosity of the Comparative polyester polyols.

Example 4: Preparation of Polyurethane Coating Composition

Polyester polyols prepared in accordance with Examples 1, 2, and 3, and Comparative polyester polyol 1 (AA/TMP/NPG), were formulated into polyurethane coatings following the general procedure set forth below.

General Procedure for Making Urethane Coating
1. Polyol resin is added to a pint glass jar.
2. For formulations using an oxazolidine water scavenger (Incozol® 2), the additive is added and mixed at low speed on a benchtop mixer fitted with a small Jiffy blade for 15 minutes. The jar is sealed and allowed to rest for a minimum of 18 hours to allow Incozol® 2 to react with any residue moisture.
3. All remaining B-side ingredients are then added to the jar and mixed a minimum of 15 mins. on a benchtop air mixer fitted with a small Jiffy blade at low speed.
4. Immediately before use, the specified amount of isocyanate (A-side) is added to the completed B-side formulation and mixed for approximately 5 minutes using a benchtop air mixer fitted with a Jiffy blade at low speed.
5. A small amount of activated clear urethane formulation is poured onto a cold-rolled steel panel, aluminum panel or Leneta card and the mixture is drawn down using a 150 micron wire-wound drawdown bar.

Formulations 1, 2, and 3 comprise the polyester polyols according to Example 1, 2, and 3, respectively. The Comparative formulation comprises Comparative polyester polyol 1 (AA/TMP/NPG). The components of each of Formulations 1-3 and the Comparative formulation are shown in Table 2. Also shown in Table 2 are five Control formulations, Control 1, 2, 3, 4 and 5, which use standard commercial coating materials in the formulations. Control 1 comprises a branched polyester polyol diluted in 1-methoxypropylacetate (65% solids) as the polyester polyol component. Control 2 comprises a high solids (80% solids) acrylic polyol in n-methylamylketone solvent, as the polyol component. Control 3 comprises a difunctional bisphenol A/epichlorohydrin derived epoxy resin (100% solids), Control 4 comprises a branched polyether/polyester resin, and Control 5 comprises a combination of aspartic resins. All amounts in Table 2 are in grams.

TABLE 2

Aliphatic Urethane Formulations

| | Comparative Formulation | Formulation 1 | Formulation 2 | Formulation 3 | Control 1 | Control 2 | Control 3 | Control 4 | Control 5 |
|---|---|---|---|---|---|---|---|---|---|
| B-Side | | | | | | | | | |
| Example 1 Polyester polyol | | 100 | | | | | | | |
| Example 2 Polyester polyol | | | 100 | | | | | | |
| Example 3 Polyester polyol | | | | 100 | | | | | |
| Comparative Polyester polyol 1 | 100 | | | | | | | | |
| Control 1 SB polyester | | | | | 100 | | | | |
| Control 2 SB Acrylic | | | | | | 100 | | | |
| Control 3 Epoxy | | | | | | | 92 | | |
| Diluent | | | | | | | 8 | | |
| Control 4 PES/PET Hybrid | | | | | | | | 100 | |

TABLE 2-continued

Aliphatic Urethane Formulations

| | Comparative Formulation | Formulation 1 | Formulation 2 | Formulation 3 | Control 1 | Control 2 | Control 3 | Control 4 | Control 5 |
|---|---|---|---|---|---|---|---|---|---|
| Control 5 Aspartic | | | | | | | | | 15.24 (F420) 30.49 (F520) |
| reactive diluent[1] | | | | | | | | | 6.1 |
| water scavenger[2] | | | | 2 | | | | | |
| adhesion[3] promoter | | | | | | | | 1 | |
| deaerator[4] | | | | | | | 0.7 | | |
| deaerator[5] | | | | 1.44 | 0.87 | | | | 0.74 |
| leveling[6] agent | 0.56 | 0.5 | 0.54 | 0.62 | 0.37 | 0.37 | | 0.52 | 0.23 |
| defoamer[7] | | | | 1.03 | 0.62 | | | | |
| n-Butyl acetate solvent | 21.57 | 14.03 | 12.35 | 12.92 | 23.74 | 11.05 | | 3.81 | |
| EEP | | | | | | | | | 8.3 |
| 1% DBTDL in nBA catalyst | 1.99 | 2 | 1.63 | 2.01 | 1.26 | 1.16 | | 2.02 | |
| A-Side | | | | | | | | | |
| aliphatic[8] isocyanate | 98.75 | 99.85 | 103.62 | 101.19 | 59.03 | 36.6 | | 101.69 | |
| amine epoxy[9] curing agent | | | | | | | 37.54 | | |
| aliphatic[10] isocyanate | | | | | | | | | 38.76 |

*Solvent was added in amount to obtain a target viscosity of 1,000 cps for each formulation.
[1]Arnox 6 - aldimine reactive diluent from Arnette Polymers, LLC
[2]Incozol ® 2 oxazolidine moisture scavenger from Incorez Ltd.
[3]Silquest A187-adhesion promoter
[4]Byk ® A535 - silicone and polymeric defoamer from Byk.
[5]Byk ® A530- silicone and polymeric defoamer from Byk.
[6]Byk ® 361N - polyacrylate leveling agent from Byk.
[7]Byk ® 067A - non-aqueous polysiloxane defoamer from Byk.
[8]Desmodur ® N3200 - aliphatic polyisocyanate resin from Covestro.
[9]Epikure 3370-amine epoxy curing agent.
[10]Desmodur ® N3600 - aliphatic polyisocyanate resin from Covestro.

The formulations were evaluated for VOC content, gloss, abrasion resistance, Shore D hardness, and pencil hardness. The results are shown in Table 3.

TABLE 3

Physical Properties

| Polyol | VOC (g/L) | 60° Gloss | Taber Abrasion (mg loss) | Shore D Hardness | Pencil Hardness |
|---|---|---|---|---|---|
| Formulation 1 | 81 | 84.9 | 11 | 33 | — |
| Formulation 2 | 71 | 84.2 | 5.3 | 54 | B |
| Formulation 3 | 81 | 84.8 | 6.2 | 51 | HB |
| Comparative Formulation | 114 | 84.6 | 14.5 | 46 | — |
| Control 1 | 345 | 84.2 | 29.8 | 42 | F |
| Control 2 | 207 | 84.1 | 74 | 20 | 2B |
| Control 3 | 0 (100% Solids) | 92.5 | 83.9 | 89 | — |
| Control 4 | 29 | 85.6 | 51.5 | 61 | 4B |
| Control 5 | 97 | 86.6 | 69.1 | 47 | — |

From the results in Table 3, it can be seen that formulations prepared with the polyester polyols of the present technology had significantly better abrasion resistance, compared to the Comparative formulation and all five Control formulations. Formulations 1-3 also had significantly lower VOC contents compared to the Comparative and Control 1 and 2 formulations, and comparable gloss compared to the Comparative and Control 1, 2, 4, and 5 formulations. Formulations 2 and 3 also had higher Shore D hardness than the Comparative formulation and Control 1, 2, and 5 formulations, and higher pencil hardness than the Control 2 and Control 4 formulations. The results indicate that polyester polyols of the present technology can be formulated into coatings that provide comparable or higher hardness than coatings prepared with standard polyols. The results also demonstrate that coatings prepared using the polyester polyols of the present technology provide improved abrasion resistance compared to coatings prepared with standard resins used in coating applications.

Example 5: Chemical Resistance Testing

Formulations 1-3, the Comparative formulation, and Control formulations 1-5 were evaluated for chemical resistance in different testing solutions. The results after 4 weeks of testing are shown in Table 4. The numbers in the table represent the change in total weight percent of each sample after the duration of the test. Numbers closer to zero indicate less change in sample weight and better chemical resistance. If the sample was destroyed before the end of the 4 weeks, that is also noted in the table.

TABLE 4

Chemical Resistance
Chemical Resistance (4 week immersion) [1]

| Polyol | 10% HCl[2] | 10% $H_2SO_4$[2] | 10% NaOH[2] | Skydrol ® | Xylene | Ethanol | Water |
|---|---|---|---|---|---|---|---|
| Formulation 1 | 3.21 | 2.17 | 1.90 | 9.67 | 9.02 | 24.20 | 3.72 |
| Formulation 2 | 0.14 | 0.72 | 1.98 | 8.58 | 5.81 | 22.93 | 2.47 |
| Formulation 3 | 2.14 | 2.1 | 1.88 | 4.32 | 4.75 | 19.62 | 2.61 |
| Comparative Formulation 1 | 0.0 | 0.88 | 0.8 | 3.3 | 4.5 | 18.90 | 1.1 |
| Control 1 | −4.81 | −1.65 | −3.58 | −3.08 | −0.51 | −0.35 | −2.63 |
| Control 2 | Destroyed | −4.1 | −4.39 | 0.95 | Destroyed | 6.78 | −3.66 |
| Control 3 | 0.64 | 0.98 | 0.45 | 1.01 | 8.52 | 8.56 | 0.50 |
| Control 4 | 0.84 | 1.2 | 0.60 | 6.29 | Destroyed | Destroyed | 1.16 |
| Control 5 | 0.61 | 1.01 | 0.83 | 5.86 | Destroyed | 27.56 | 1.25 |

[1] Numbers are change in total weight percent.
[2] 10% by weight in aqueous solution.

The results in Table 4 show that the polyurethane coatings prepared from Formulations 1-3 generally had better performance (i.e., less weight loss) in 10% HCl aqueous solution, and 10% aqueous solution NaOH, than the Control formulations 1 and 2, and better performance in xylene compared to the Control formulations 2-5. Formulations 1-3 had generally equal performance in water compared to the Control formulations 1 and 2. Formulation 2 had better 10% sulfuric acid resistance than any of the Control formulations.

Example 6: UV Resistance and Gloss Testing

Samples prepared from Formulations 1-3, the Comparative formulation, and Control 1, 2, and 4 formulations were evaluated for color change (ΔE). For ΔE, the ideal value is zero, indicating no color change has occurred. Accordingly, the least amount of ΔE change indicates better UV resistance. The results of the ΔE measurements for Formulations 1-3, the Comparative formulation, and Control 1, 2, and 4 formulations are graphically illustrated in FIG. 1.

As shown in FIG. 1, the samples prepared from Formulation 1 and 2 of the present technology had a smaller ΔE change than the ΔE changes for the samples prepared from any of the Control formulations. The smaller ΔE changes for Formulations 1 and 2 indicate better UV resistance and stability compared to the Control formulations.

Figure 2:
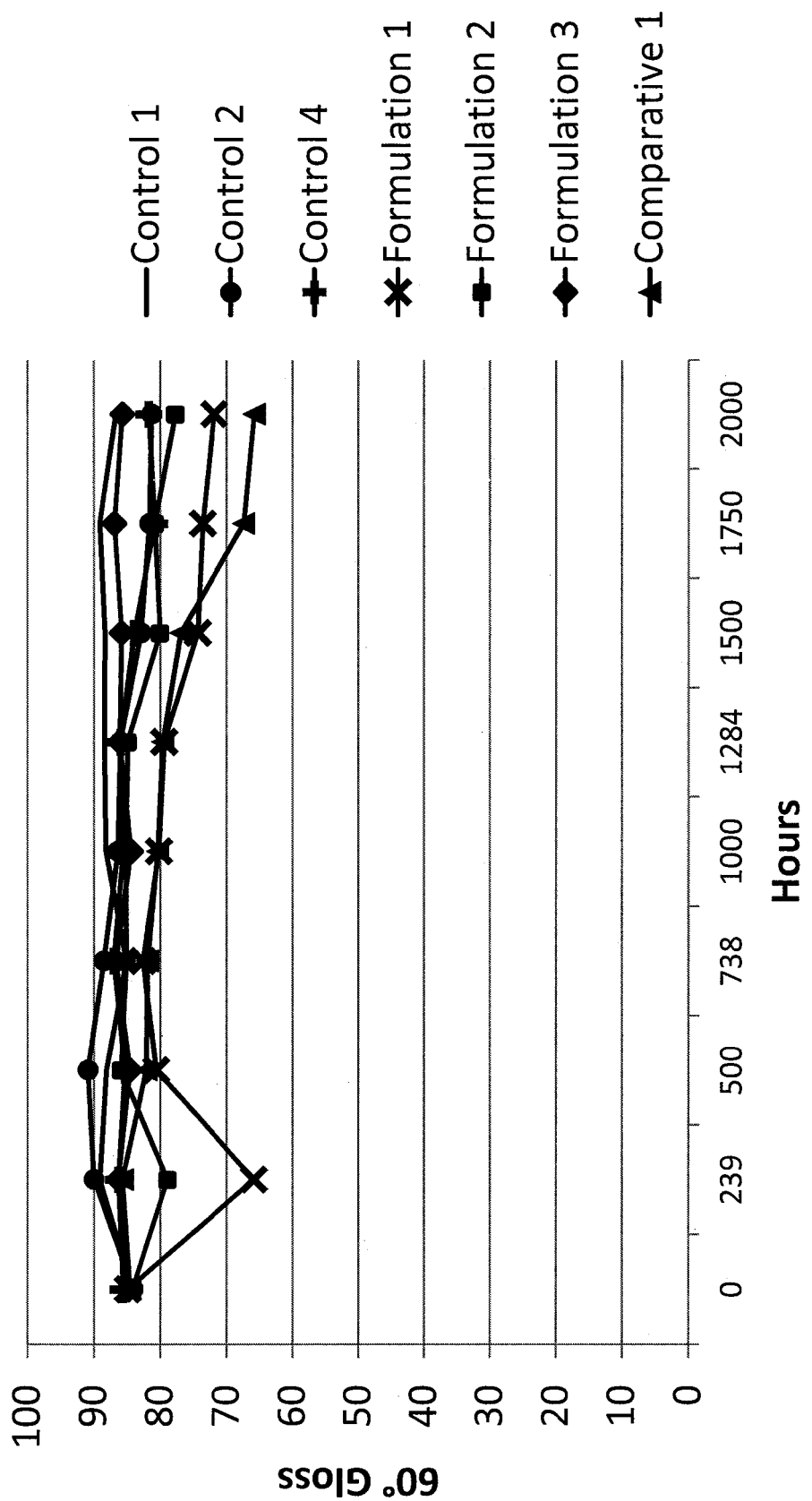
FIG. 2 is a graph showing the gloss levels for polyurethane coating formulations of the present technology and commercial coating formulations after UV exposure over a period of 2000 hours.

The samples were also evaluated for change in gloss. Ideally, there should be no change in gloss over time. Gloss levels that are consistent when measured after different time intervals indicate good UV resistance and stability. The results of the gloss measurements for samples prepared from Formulations 1-3, the Comparative formulation, and the Control 1, 2, and 4 formulations are graphically illustrated in FIG. 2. As shown in FIG. 2, although there is some loss of gloss for Formulations 1 and 2, the gloss levels for all three of Formulations 1-3 are relatively stable over time. FIG. 2 also shows that the gloss levels for Formulations 1-3 are more stable than the gloss levels of the Comparative formulation.

Figure 3:
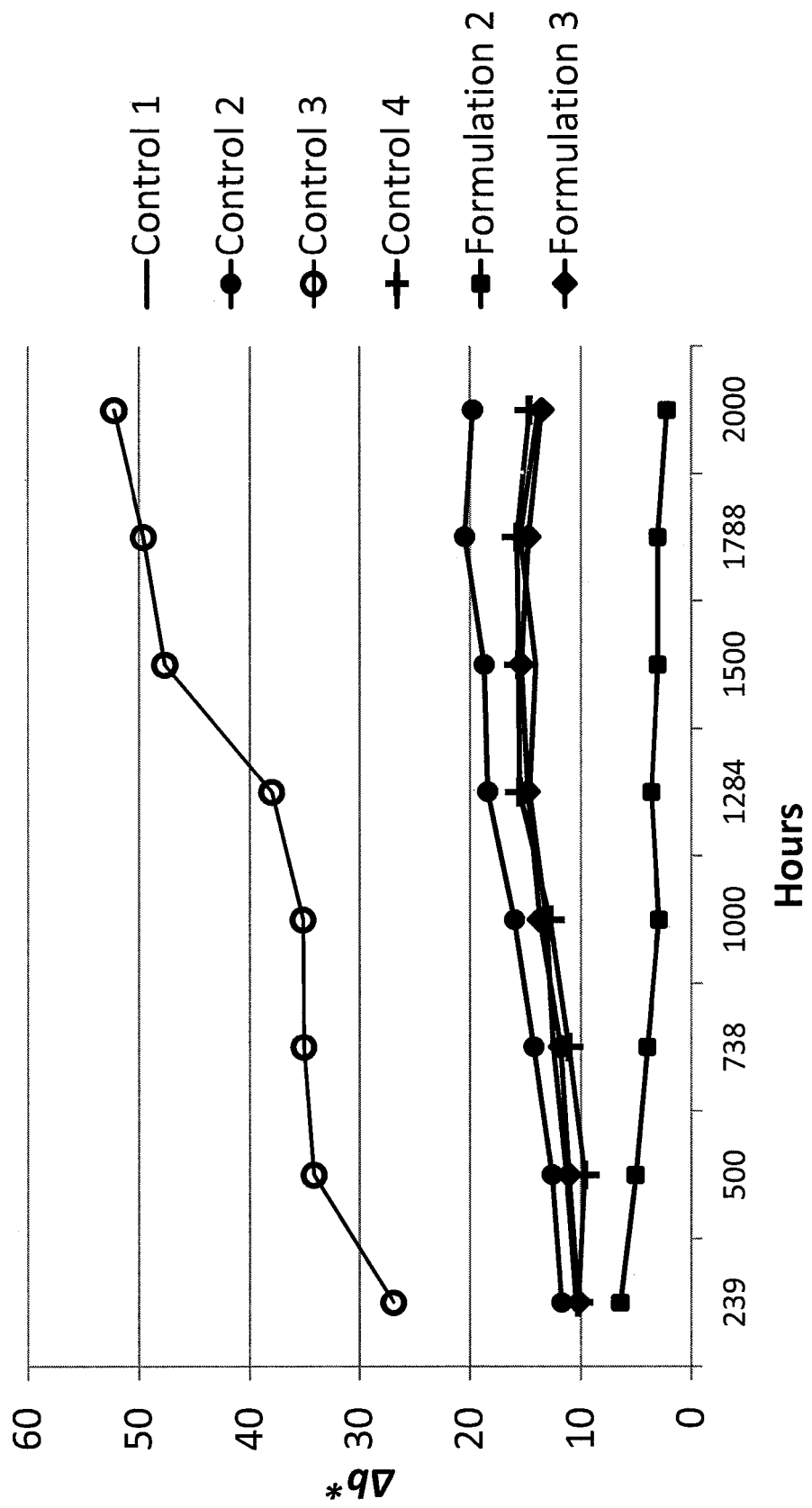
FIG. 3 is a graph showing the Δb* levels for polyurethane coating formulations of the present technology and commercial coating formulations after UV exposure over a period of 2000 hours.

Formulations 2 and 3, and the Control formulations 1, 2, 3, and 4, were evaluated for changes in b* values over time. For Δb*, the ideal value is zero, indicating no yellowing of the sample. Yellowness was evaluated using (Δb*) of a formulated clear coating applied over an automotive white basecoat panel. As shown in FIG. 3, the Control 3 (epoxy) formulation had the greatest yellowness change after 2000 hours of exposure. Formulation 2 and 3 were either better or comparable to the Control formulations 1, 2, and 4.

Example 7: Adhesion Testing

Polyurethane coatings were prepared from formulations substantially the same as Formulations 2 and 3 following the general procedure of Example 4. A fluorocarbon additive was added to each formulation to reduce surface tension of the coating composition. Coatings were also prepared from formulations substantially the same as each of the Control formulations 1-5. A fluorocarbon additive was added to each of these coating compositions to reduce surface tension. Having a reduced surface tension allows the coating composition to provide better substrate wetting.

Each of the coating compositions was applied to a variety of different substrates to evaluate the adhesion or bonding of the coating to the substrate. The coating compositions were drawn down on each substrate using a 150 micron wirewound drawdown bar, and allowed to cure at ambient temperature for at least 2 weeks. Adhesion of the coatings was measured by the cross-hatch tape test according to ADTM D 3359-95. Briefly, a lattice pattern with cuts in each direction is made in the film to the substrate. Pressure-sensitive tape is applied over the lattice and then removed. Test Method B is used to evaluate adhesion, wherein a rating of 5 indicates 0% of the coating is removed, and a rating of 0 indicates greater than 65% of the coating is removed. The results of the adhesion testing are shown in Table 5. A rating of 4B or 5B indicates good adhesion, a rating of 3B indicates fair adhesion, and a rating of 0B-2B indicates poor adhesion.

TABLE 5

Adhesion Testing

| Substrate | Formulation 2 | Formulation 3 | Control 1 SB Polyester | Control 2 Acrylic | Control 3 Epoxy | Control 4 PES/PET | Control 5 Aspartic |
|---|---|---|---|---|---|---|---|
| Aluminum (Chromium Treated) | 5B | 5B | 4B | 5B | 5B | 5B | 5B |
| Aluminum (untreated) | 5B | 5B | 5B | 5B | 5B | 5B | 5B |
| CRS—cold rolled steel | 5B | 5B | 0B | 4B | 0B | 2B | 5B |
| Bondrite 1000 - phosphatized steel | 5B | 5B | 5B | 5B | 3B | 5B | 5B |
| Galvanized Steel | 1B | 4B | 0B | 2B | 0B | 5B | 3B |
| PVC polyvinyl chloride (RM 9000) | 5B | 5B | 5B | 0B | 0B | 0B | 0B |
| TPO thermoplastic polyolefin (D161) | 0B | 0B | 0B | 0B | 0B | 0B | 0B |
| PP polypropylene(HSBMCB 1158) | 0B | 0B | 0B | 0B | 0B | 0B | 0B |
| ABS acrylonitrile-butadiene-styrene copolymer (Cycolac MG38) | 5B | 5B | 0B | 5B | 0B | 0B | 5B |
| Concrete | 5B | 5B | 3B | 5B | 5B | 3B | 5B |
| PC polycarbonate (Lexan LS2) | 5B | 5B | 0B | 0B | 0B | 0B | 0B |

The results in Table 5 show that the coating compositions comprising the polyester polyols of the present technology are able to achieve equal or better adhesion to several different substrates compared to the commercial resins used in Control formulations 1-5. Formulation 3 is especially notable in that the polyurethane coating prepared from Formulation 3 demonstrated good adhesion to all the substrates, except thermoplastic polyolefin and polypropylene. The improved adhesion allows the polyester polyols of the present technology to be used in coating compositions that have a wide range of applications.

Example 8: Resin Compatibility

Polyester polyols of the present technology were blended with other resin types to assess the compatibility of the polyols with the other resins. Polyester polyols prepared according to Example 2 (AA/HPHP/TMP3EO/EG) and Example 3 (AA/Isophthalic acid/TMP3EO/MP-Diol) were each blended with the specified amount (10%, 25%, or 50%) of a commercially available resin as supplied. The resin amounts blended with these Example 2 and Example 3 polyols are based on total weight of the resin blend. The mixtures were blended by hand for 5 minutes, allowed to rest for 24 hours, and then visually inspected for phase separation. The results are shown in Table 6.

TABLE 6

Resin Compatibility

| Product | Example 2 Polyol | | | Example 3 Polyol | | |
|---|---|---|---|---|---|---|
| Loading | 10% | 25% | 50% | 10% | 25% | 50% |
| Polyether Polyol (2 functional) | PC | PC | PC | PC | PC | PC |
| Polyether Polyol (4.5 functional) | C | C | C | C | C | C |
| Low MW Acrylic Polyol | C | C | C | C | C | C |
| High MW Acrylic Polyol | C | C | C | C | C | C |
| Branched Aliphatic Polyester Polyol | C | C | C | C | C | C |
| Linear Polyester Polyol | C | C | C | C | C | C |
| Methylated Melamine Resin | C | C | C | C | C | C |

TABLE 6-continued

Resin Compatibility

| Product | Example 2 Polyol | | | Example 3 Polyol | | |
|---|---|---|---|---|---|---|
| Loading | 10% | 25% | 50% | 10% | 25% | 50% |
| Thermoplastic Acrylic | NC | NC | NC | NC | NC | NC |
| Short Oil Alkyd | PC | C | C | PC | PC | PC |
| Medium Oil Alkyd | PC | PC | PC | PC | PC | PC |

C = Compatible;
PC = Partially Compatible;
NC = Not Compatible

"Compatible" indicates a mixture that is fully miscible with no phase separation; "Partially Compatible" indicates a hazy mixture; and "Not Compatible" indicates a mixture that has phase separated. The results in Table 6 show that the Example 2 and Example 3 polyester polyols are compatible with most of the resin systems tested. The compatibility with other resin systems could be useful in formulating coatings that are based on multiple resin systems. In addition, since the low VOC polyols of the present technology are compatible with high VOC resins, such as acrylates, they can be blended with the high VOC resins to reduce the total VOCs in the resin system.

Example 9: Aromatic Isocyanate Formulations

Polyester polyols of the present technology, Polyester Polyol 4 (AA/HPHP/TMP3EO/EG) and Polyester Polyol 5 (AA/Iso/TMP3EO/MP-Diol), were prepared generally in accordance with Examples 2 and 3 above. These polyester polyols were used to prepare polyurethane coating formulations, Formulation 4 and Formulation 5, respectively. Formulation 4 and Formulation 5 are similar to Formulation 2 and Formulation 3 (see Table 2), respectively, except Formulations 4 and 5 include an aromatic isocyanate (polymeric MDI) instead of an aliphatic isocyanate, and additional wetting agent. Control formulations 6, 7, 8, 9, and 10, similar to Control formulations 1, 2, 3, 4, and 5 (see Table 2), respectively, were also prepared except using an aromatic isocyanate (polymeric MDI) in Control formulations 6, 7, 9, and 10 instead of an aliphatic isocyanate (Control formulation 8 comprised an amine epoxy curing agent). Also, Control formulation 10 used 100% of the F520 aspartic resin instead of a blend of F420 and F520 resins, due to the high reactivity of the resin blend with the aromatic isocyanate. Polyurethane coatings were prepared from Formulations 4 and 5, and Control formulations 6, 7, 8, 9, and 10 using the general procedure described in Example 4. The coatings were evaluated for VOC content, gloss, abrasion resistance, Shore D hardness, König hardness, and pencil hardness. The results are shown in Table 7.

TABLE 7

Physical Properties

| Formulation | VOC (g/L) | 60° Gloss | Taber Abrasion (mg loss) | Shore D Hardness | König Hardness | Pencil Hardness |
|---|---|---|---|---|---|---|
| Formulation 4 | 99 | 98 | 48.3 | 47 | 72 | B |
| Formulation 5 | 105 | 100 | 50.2 | 43 | 70 | 2B |
| Control 6 (SB polyester) | 379 | 72.9 | 77.1 | 71 | 77 | HB |
| Control 7 (SB acrylic) | 213 | 96.2 | 126.6 | 46 | 91 | HB |
| Control 8 (Epoxy) | 0 (100% Solids) | 92.5 | 83.9 | 89 | 140 | F |
| Control 9 (PES/PET) | 0 | 96.3 | 77.2 | 83 | 113 | B |
| Control 10 (Aspartic) | 70 | 96.5 | 154.8 | Brittle | 116 | B |

The results in Table 7 show that the aromatic polyurethane formulations prepared with polyester polyols of the present technology had better abrasion resistance than the aromatic Control formulations, and significantly lower VOC contents compared to the Control 6 and 7 formulations.

The formulations were also evaluated for chemical resistance in different testing solutions. The results after 4 weeks of testing are shown in Table 8. The numbers in the table represent the change in total weight percent of each sample after the duration of the test. Numbers closer to zero indicate less change in sample weight and better chemical resistance. If the sample was destroyed before the end of the 4 weeks, that is also noted in the table.

TABLE 8

Chemical Resistance
Chemical Resistance (4 week immersion) [1]

| Formulation | 10% HCl[2] | 10% H$_2$SO$_4$[2] | 10% NaOH[2] | Skydrol ® | Xylene | Ethanol | Water |
|---|---|---|---|---|---|---|---|
| Formulation 4 | −5.16 | −4.53 | −4.94 | 15.27 | −2.49 | 0.94 | −3.97 |
| Formulation 5 | −3.59 | −3.19 | −3.74 | 6.80 | −2.57 | −0.13 | −2.58 |
| Control 6 | −4.07 | −4.02 | −3.5 | −4.42 | −2.51 | −5.40 | −3.77 |
| Control 7 | −4.17 | −3.61 | −3.82 | 10.36 | 23.43 | 1.70 | −3.14 |
| Control 8 | 0.64 | 0.98 | 0.45 | 1.01 | 8.52 | 8.56 | 0.50 |
| Control 9 | 0.29 | 0.36 | 0.41 | 5.88 | 24.51 | 20.18 | 0.27 |
| Control 10 | Destroyed 3 wks | Destroyed 3 wks | −0.32 | Destroyed 3 wks | 17.76 | 48.2 | −0.06 |

[1] Numbers are change in total weight percent.
[2] 10% by weight in aqueous solution.

The results in Table 8 show that the polyurethane coatings prepared from Formulations 4 and 5 had less weight loss in ethanol compared to the control formulations, and comparable or less weight loss in xylene compared to the control formulations.

The VOC content, abrasion resistance, hardness properties, and chemical resistance properties of the aromatic polyurethane coatings from Formulations 4 and 5 were compared to those of aliphatic polyurethane coatings prepared from Formulations 2 and 3. The Shore D and pencil hardness properties were similar for both types of coatings. The aromatic polyurethane coatings had higher König hardness values than the aliphatic polyurethane coatings, as shown in Table 9. The aliphatic polyurethane coatings had more abrasion resistance (less loss), than the aromatic polyurethane coatings, as shown in Table 10. The aliphatic polyurethane coatings also had less VOC content than the aromatic polyurethane coatings.

TABLE 9

König Hardness

| | Aliphatic | Aromatic |
|---|---|---|
| Formulation 4 | 23 | 72 |
| Formulation 5 | 27 | 70 |

TABLE 10

Abrasion Resistance

| | Aliphatic | Aromatic |
|---|---|---|
| Formulation 4 | 6.0 | 48.3 |
| Formulation 5 | 5.5 | 50.2 |

Comparing the chemical resistance results in Table 8 for Formulations 4 and 5 with those of Formulations 2 and 3 in Table 4, it can be seen that the aliphatic polyurethane coatings (Formulations 2 and 3) had less weight loss (better performance) in Skydrol compared to the Formulation 4 and 5 aromatic polyurethane coatings. The Formulation 4 and 5 coatings had less weight loss in ethanol compared to the Formulation 2 and 3 aliphatic polyurethane coatings.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. A polyester polyol that is the reaction product of:
   (a) from 10 mol % to 70 mol %, based on the total mols forming the reaction product, of a polycarboxylic acid component, or an anhydride, halide, alkyl ester or lactone derivative thereof, comprising
      (i) from 55 mol % to 100 mol %, based on the polycarboxylic acid component, of at least one aliphatic polycarboxylic acid or derivative thereof, and
      (ii) from 0% to 45 mol %, based on the polycarboxylic acid component, of at least one aromatic polycarboxylic acid or derivative thereof;
   (b) from 15 mol % to 70 mol %, based on the total mols forming the reaction product, of at least one alkoxylated polyalcohol having an average functionality of 2.0 or greater; and
   (c) from 10 mol % to 70 mol %, based on the total mols forming the reaction product, of at least one polyalcohol other than an alkoxylated polyalcohol, wherein the polyalcohol other than an alkoxylated polyalcohol is:
      (i) selected from the group consisting of triethylene glycol, propylene glycol, dipropylene glycol, trimethylene glycol, butylene glycols, neopentyl glycol, 1,6-hexanediol, 2-methyl-1,3-propanediol, 1,3-butanediol, 1,4-butanediol, 1,5-pentanediol, 3-hydroxy-2,2-dimethylpropyl-3-hydroxy-2,2-dimethyl propanoate, 1,2-cyclohexandiol, 1,3-cyclohexanediol, 1,3-cyclohexanedimethanol, 1,4-cyclohexanedimethanol, resorcinol, hydroquinone, poly(oxyalkylene) polyols derived by the condensation of ethylene oxide, propylene oxide, or a combination thereof, glycerol, diglycerol, trimethylolpropane, pentaerythritol, dipentaerythritol, sucrose, glucose, fructose, sorbitol and mannitol, and combinations thereof, or
      (ii) ethylene glycol in an amount of about 1.4 mol % combined with a polyalcohol selected from the group consisting of triethylene glycol, propylene glycol, dipropylene glycol, trimethylene glycol, butylene glycols, neopentyl glycol, 1,6-hexanediol, 2-methyl-1,3-propanediol, 1,3-butanediol, 1,4-butanediol, 1,5-pentanediol, 3-hydroxy-2,2-dimethylpropyl-3-hydroxy-2,2-dimethyl propanoate, 1,2-cyclohexandiol, 1,3-cyclohexanediol, 1,3-cyclohexanedimethanol, 1,4-cyclohexanedimethanol, resorcinol, hydroquinone, poly(oxyalkylene) polyols derived by the condensation of ethylene oxide, propylene oxide, or a combination thereof, glycerol, diglycerol, trimethylolpropane, pentaerythritol, dipentaerythritol, sucrose, glucose, fructose, sorbitol and mannitol, and combinations thereof;
   wherein the polyester polyol has a functionality of 2.0 or greater, a viscosity of about 1,000 cP to about 10,000 cP at 25° C., and an OH value of 200 to 800 mg KOH/g.

2. The polyester polyol of claim 1, wherein the at least one alkoxylated polyalcohol is selected from diols, triols, polyalcohols that have an average functionality of greater than three, and combinations thereof.

3. The polyester polyol of claim 2, wherein the at least one alkoxylated polyalcohol is selected from one or more of alkoxylated glycerol, alkoxylated diglycerol, alkoxylated trimethylolpropane, alkoxylated pentaerythritol, alkoxylated dipentaerythritol, alkoxylated sucrose, alkoxylated glucose, alkoxylated fructose, alkoxylated lactose, alkoxylated sorbitol, alkoxylated mannitol, alkoxylated methyl glucoside, and combinations thereof.

4. The polyester polyol of claim 1, wherein the at least one alkoxylated polyalcohol comprises alkoxylated trimethylolpropane.

5. The polyester polyol of claim 1, wherein the at least one aliphatic polycarboxylic acid is selected from straight or branched aliphatic diacids, cycloaliphatic diacids, aliphatic polycarboxylic acids that have a functionality of 3 or more, and mixtures thereof.

6. The polyester polyol of claim 5, wherein the at least one aliphatic polycarboxylic acid is selected from glutaric acid, adipic acid, succinic acid, maleic acid, fumaric acid, sebacic acid, pimelic acid, octanedioic acid, dodecanedioic acid, azelaic acid, citric acid, isocitric acid, 1,4 cyclohexanedicarboxylic acid, and mixtures thereof.

7. The polyester polyol of claim 1, wherein the at least one aliphatic polycarboxylic acid is adipic acid.

8. The polyester polyol of claim 1, wherein, when present, the at least one aromatic polycarboxylic acid is selected from straight or branched aromatic diacids, aromatic polycarboxylic acids that have a functionality of 3 or greater, and mixtures thereof.

9. The polyester polyol of claim 8, wherein the at least one aromatic polycarboxylic acid is selected from phthalic acid, terephthalic acid, isophthalic acid, trimellitic acid, pyromellitic acid, trimellitic anhydride, and pyromellitic anhydride.

10. A polyester polyol blend for preparing a polyurethane composition, the polyester polyol blend comprising:
    the polyester polyol of claim 1; and
    one or more additional components having two or more active hydrogen groups;
    wherein the polyurethane composition is a coating, adhesive, sealant, elastomer, or foam.

11. The polyester polyol blend of claim 10, wherein the one or more additional components are selected from polyester polyols, polyether polyols, polyetherester polyols, polycarbonate polyols, acrylic polyols, amine polyols, polycaprolactones, silicones, hydroxyl-containing thioethers, aspartic resins, and ketimine resins.

12. A polyurethane composition comprising:
    (1) the polyester polyol of claim 1;
    (2) optionally, one or more additional components having two or more active hydrogen groups; and
    (3) at least one polyisocyanate.

13. The polyurethane composition of claim 12, wherein the polyurethane composition has a VOC content of less than 200 g/liter.

14. The polyurethane composition of claim 12, wherein the polyurethane composition is a two-part coating composition comprising an A-side and a B-side, wherein the B-side comprises the polyester polyol and, when present, the one or more additional components having two or more reactive hydrogen groups, and the A-side comprises at least one polyisocyanate in an amount to provide a proportion of NCO to OH groups of about 0.9:1 to about 1.3:1.

15. The polyurethane composition of claim 14, wherein the polyisocyanate is a biuret or isocyanurate of hexamethylene diisocyanate having a functionality of about three and an NCO content of about 23 weight percent.

16. The polyurethane composition of claim 12, wherein the polyester polyol reaction product comprises from 5% to 95% by weight of the B side.

\* \* \* \* \*